United States Patent [19]

Tsuno et al.

[11] Patent Number: 4,719,075

[45] Date of Patent: Jan. 12, 1988

[54] METAL-CERAMIC COMPOSITE ARTICLE AND A PROCESS FOR MANUFACTURING THE SAME

[75] Inventors: Nobuo Tsuno, Kasugai; Minoru Matsui, Nagoya, both of Japan

[73] Assignee: NGK Insulators, Ltd., Japan

[21] Appl. No.: 700,102

[22] Filed: Feb. 11, 1985

[30] Foreign Application Priority Data

Aug. 3, 1984 [JP] Japan .............................. 59-162790

[51] Int. Cl.[4] .............................................. B22F 7/02
[52] U.S. Cl. ......................................... 419/5; 419/10; 419/13; 419/17; 428/547; 148/127; 29/23.5; 416/241 B; 123/193 R
[58] Field of Search ................. 419/5, 8, 10, 13, 14, 419/17, 57; 148/127; 156/293, 294; 29/23.5, 156.6; 123/193 R; 428/627, 469, 547; 417/407; 416/241, 241 B

[56] References Cited

U.S. PATENT DOCUMENTS

| | | |
|---|---|---|
| 1,794,782 | 3/1931 | Lord . |
| 1,940,870 | 12/1933 | Litton . |
| 2,297,508 | 9/1942 | Schutte . |
| 2,891,525 | 6/1959 | Moore . |
| 2,933,386 | 4/1960 | Pessel ............................ 419/45 |
| 3,321,565 | 5/1967 | Peterson et al. . |
| 3,604,819 | 9/1971 | Krahe et al. . |
| 3,666,302 | 5/1972 | Kellett . |
| 3,801,226 | 4/1974 | Bevan et al. . |
| 4,014,968 | 3/1977 | Simon . |
| 4,123,199 | 10/1978 | Shimuzu et al. . |
| 4,176,519 | 12/1979 | Kronogard . |
| 4,214,906 | 7/1980 | Langer et al. ............... 75/208 R |
| 4,256,441 | 3/1981 | Arora . |
| 4,270,380 | 6/1981 | Gulati et al. . |
| 4,279,576 | 7/1981 | Okano et al. ............... 417/407 |
| 4,281,941 | 8/1981 | Rottenkolber . |
| 4,325,647 | 4/1982 | Maier et al. . |
| 4,341,826 | 7/1982 | Preuo et al. ............... 428/35 |
| 4,404,935 | 9/1983 | Kraft . |
| 4,424,003 | 1/1984 | Brobeck . |
| 4,479,293 | 10/1984 | Miller et al. . |
| 4,479,735 | 10/1984 | Thompson et al. . |
| 4,492,737 | 1/1985 | Conolly ............... 428/552 |
| 4,495,684 | 1/1985 | Sander et al. . |
| 4,503,009 | 3/1985 | Asaka ............... 419/6 |
| 4,518,315 | 5/1985 | Kruger . |
| 4,531,269 | 7/1985 | LaBouff . |
| 4,538,786 | 10/1985 | Yohe ............... 419/29 |
| 4,614,453 | 9/1986 | Tsuno et al. ............... 403/30 |

FOREIGN PATENT DOCUMENTS

| | | |
|---|---|---|
| 95540 | 12/1983 | European Pat. Off. . |
| 139406 | 5/1985 | European Pat. Off. . |
| 142334 | 5/1985 | European Pat. Off. . |
| 2845716 | 4/1980 | Fed. Rep. of Germany . |
| 58-214018 | 7/1983 | Japan . |
| 1394919 | 5/1975 | United Kingdom . |
| 2104551 | 3/1983 | United Kingdom ............... 419/5 |
| 502133 | 4/1976 | U.S.S.R. . |

OTHER PUBLICATIONS

American Society for Metals; vol. 3, Ed. 9, U.S. Ohio, 1980, "Properties and Selections: Stainless Steels, Tool Materials and Special Purpose Metals".
European Search Report EP 85 30 0976—3 pages, Patent Abstracts of Japan, vol. 8, No. 220 (M-330).

Primary Examiner—John F. Terapane
Assistant Examiner—Eric Jorgensen
Attorney, Agent, or Firm—Parkhurst & Oliff

[57] ABSTRACT

Disclosed herein is a metal-ceramic composite article which includes a metallic member made of a precipitation hardenable alloy and a ceramic member, wherein a projection of the ceramic member is fitted into a hole or a through hole formed in the metallic member and the metallic member of the composite article is hardened through precipitation hardening. A process for manufacturing such a metal-ceramic composite article is also disclosed. The manufacturing process includes the steps of: fitting a projection formed at a ceramic member into a hole formed in the metallic member made of a precipitation hardenable alloy in a state in which precipitation-hardening is not carried out to form a metal-ceramic joint body, and subjecting the thus formed metal-ceramic composite body to a precipitation hardening treatment to harden the metallic member.

21 Claims, 8 Drawing Figures

FIG_1
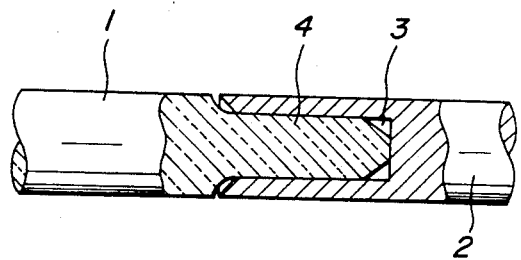
FIG_2
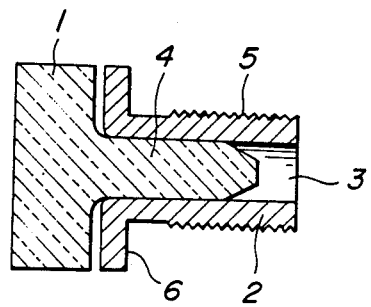
FIG_3
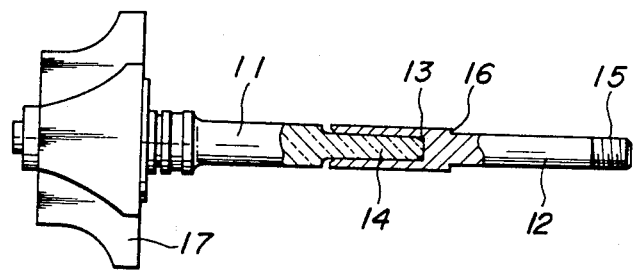

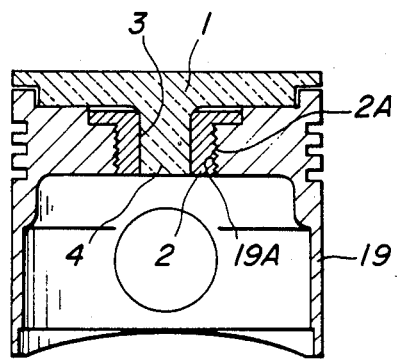
FIG_4
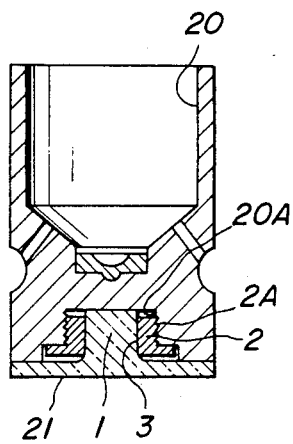
FIG_5
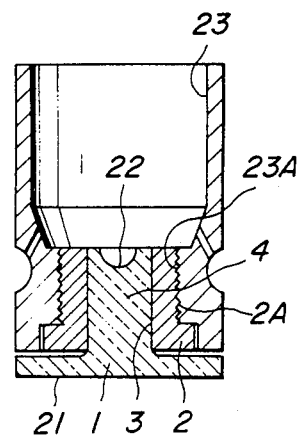
FIG_6

FIG_7
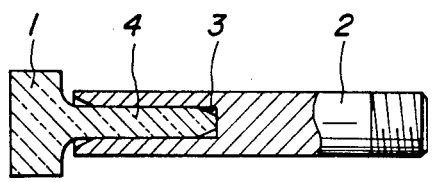
FIG_8
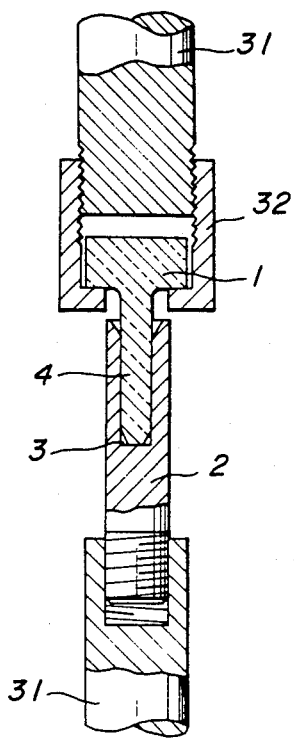

METAL-CERAMIC COMPOSITE ARTICLE AND A PROCESS FOR MANUFACTURING THE SAME

RELATED APPLICATIONS

This application relates to co-pending application Ser. No. 700,104, filed Feb. 11, 1985.

BACKGROUND OF THE INVENTION (1) Field of the Invention

The present invention relates to a metal-ceramic composite article and a process for manufacturing the same. More specifically, the invention relates to a metal-ceramic composite article in which a metallic member and a ceramic member are joined together through fitting.

(2) Description of the Prior Art

Since ceramics are not only hard and excellent in wear resistance, but also excellent in mechanical characteristics and corrosion resistance at high temperature, they are suitable for a structural material for rotors of a gas turbine and a turbocharger which require mechanical strength and wear resistance at a high temperature.

For this reason, it has been investigated that the gas turbine rotor and the turbocharger rotor are made of ceramics. For instance, U.S. Pat. No. 4,396,445 discloses a turbine rotor having the structure that blade portions and a shaft are made of ceramics. According to the turbine rotor of this structure, a threaded portion is formed at one end of the ceramic shaft, and metallic impellers of a compressor are attached to the threaded portion. However, such a turbine has the drawback that the threaded portion of the ceramic shaft is broken due to the difference in the thermal expansion between the metallic material constituting the impellers of the compressor and the ceramic material constituting the shaft portion when the turbine rotor is in use. Further, it also has the drawback that the screw thread cutting of the ceramic requires a high precision technique, which requires time and cost.

As a countermeasure against such drawbacks, there is disclosed in Japanese Utility Model Registration Application Laid-Open No. 92,097/1982 a structure in which a cylindrical portion formed at an end of a metallic shaft is fitted with a ceramic shaft of a turbine rotor. However, this structure has the disadvantage that when the ceramic shaft is fitted into the metallic shaft after the outer surface of the cylindrical portion of the metallic shaft is surface-hardened to increase the wear resistance of a bearing-contact surface of the metallic shaft, cracks are produced at the surface-hardened portion of the metallic shaft. Moreover, when the surface of the metallic shaft is subjected to the surface hardening treatment, such as a nitriding treatment, after the metallic shaft and the ceramic shaft are fitted together, the tightness at the fitting portion decreases or the fitted metallic shaft slips out from the fitting portion. In addition, when quenching is carried out after the metallic shaft and the ceramic shaft are fitted together, the ceramic shaft slips out from the fitted portion of the metallic shaft due to the phase transformation of the metallic shaft due to the quenching. Therefore, the above structure has the drawback that since the wear resistance is poor at the bearing-contact surface of the metallic shaft, it can not be practically used.

SUMMARY OF THE INVENTION

It is therefore an object of the present invention to provide a metal-ceramic composite article of a novel structure which forms a firm joint between a ceramic shaft of a turbine rotor or the like and a metallic shaft fitted thereto without suffering from slack or slip-out, and an improved process for manufacturing the same.

More specifically, the object of the present invention is to provide a metal-ceramic composite article having a large tightness.

It is another object of the present invention to provide a process for manufacturing such a metal-ceramics composite article.

It is a still another object of the present invention to provide a metal-ceramic composite article having an excellent wear resistance at the surface of a metallic portion.

It is a further object of the present invention to provide a process for manufacturing such a metal-ceramic composite article.

According to the present invention, there is a provision of a metal-ceramic composite article into which a projection formed in a ceramic member is fitted into a hole or a through hole provided in a metallic member made of a precipitation hardenable alloy and the metal portion of the thus formed composite body is hardened through precipitation hardening.

According to another aspect of the invention, there is a provision of a process for manufacturing the metal-ceramic composite article in which after the projection formed in a ceramic member is fitted to a metallic member made of a precipitation hardenable alloy in a state in which precipitation hardening is not effected to form a metal-ceramic composite body, the composite body is subjected to a precipitation hardening treatment to harden the metallic member.

These and other objects, features, and advantages of the invention will be more apparent upon reading of the following description of the invention when taken in conjunction with the attached drawings with the understanding that some modifications, variations and changes could be easily made by the skilled in the art to which the invention pertains without departing from the spirit of the invention or the scope of claims appended hereto.

BRIEF DESCRIPTION OF THE DRAWINGS

For a better understanding of the invention, reference is made to the accompanying drawings, wherein:

FIGS. 1 and 2 are schematic views showing vertical sections of embodiments of the metal-ceramic composite article according to the present invention;

FIG. 3 is a schematic view showing a press-fitted portion of a turbocharger rotor to which the metal-ceramic composite article according to the present invention is concretely applied;

FIG. 4 is a schematic view showing a section of a heat insulating engine piston as an example in which the metal-ceramic composite article according to the present invention is used in combination with another metallic member;

FIGS. 5-6 are schematic views illustrating sections of tappets as other examples in which the metal-ceramic composite article according to the present invention is used in combination with another metallic member;

FIG. 7 is a schematic view illustrating a structure in section of a further embodiment of the metal-ceramic composite article according to the present invention; and FIG. 8 is a schematic view illustrating an extracting test method for the metal-ceramic composite article according to the present invention.

DETAILED DESCRIPTION OF THE INVENTION

According to the present invention, a hole is formed in a metallic member made of a precipitation hardenable alloy in a non-hardened state, and a projection formed in a ceramic member is fitted into the hole to form a metal-ceramic composite body. Thereafter, the composite body is heated at a precipitation hardening temperature to harden the metallic member. If the metallic member is hardened prior to the fitting of the metallic member and the ceramic member, the metallic member and/or the ceramic member is broken during fitting of both of the members. Thus, it is unfavorable.

The fitting of the ceramic member and the metallic member which both constitute the metal-ceramic composite article according to the present invention is performed by any one of a shrinkage fitting, expansion fitting and press fitting. The shrinkage fitting and the expansion fitting are desirble in the case where the metal-ceramic composite article has a large diameter for the fitting portion, because according to the shrinkage fitting and the expansion fitting, the diameter of the projection of the ceramic member is made larger than the inner diameter of the hole of the metallic member, either one of the members to be fitted together is heated or cooled to produce the difference in diameter therebetween which allows the insertion of the ceramic member into the metallic member, and then the members are fitted together by utilizing this dimensional difference. Since the metallic material generally has a larger coefficient of thermal expansion than the ceramic material, a larger dimensional difference can be obtained by a smaller temperature difference in the case of shrinkage fitting in which the metallic member is heated, so that a stable fitting is possible. Thus, such a shrinkage fitting is more preferable. The interference in the shrinkage fitting and the expansion fitting may be set at such an amount that the hole portion of the metallic member and the projection of the ceramic member may not be broken after the fitting and that enough tightness required at the fitting portion under use conditions of the metal-ceramic composite article according to the present invention can be obtained.

On the other hand, press fitting is a method in which the projection of the ceramic member is forcedly pushed and fitted into the hole formed in the metallic member which hole has a smaller diameter than that of the projection under application of a load. Since the dimensional difference between the diameter of the projection and the inner diameter of the hole is absorbed by the elastic deformation and plastic deformation of the metallic member, the tolerance in finish dimension between the projection and the hole prior to the fitting may be larger than in the case of shrinkage fitting and expansion fitting. For this reason, press fitting is more preferable as the fitting method of the metal-ceramic composite article having a small fitting portion. The shape and the dimension of the hole of the metallic member and the projection of the ceramic member are set so that the hole portion and the projection are not broken by the load acting upon them during press fitting. The dimensional difference between the diameter of the projection and the inner diameter of the hole is so set that the fitting portion has enough tightness required to meet the use conditions of the metal-ceramic composite article according to the present invention and that both the projection and the hole portion are not broken during press fitting. To attain this, the dimensional difference between the diameter of the projection of the ceramic member and the inner diameter of the hole of the metallic member is desirable such that the diameter of the projection is larger by from 0.1 to 10%, preferably by from 1% to 5%, than the inner diameter of the hole. If the dimensional difference is smaller than 0.1%, the tightness at the press fitting portion is lacking, so that the fitting portion may be disengaged during use. If the dimensional difference is larger than 10%, the load necessary for the press fitting becomes too large, thereby unfavorably causing the projection of the ceramic member to be broken during press fitting. The press fitting may be performed at room temperature, or may be done while the metallic member is heated alone or both the metallic member and the ceramic member can be heated. However, the method in which the press fitting is carried out while both the members are heated is most preferable. When the members are both heated, the deformation resistance of the metallic member is decreased to lower the load required for press fitting, so that no fracture of the members occurs, and that the tightness is increased due to the difference in the thermal expansion between them during the cooling from the press fitting temperature. The heating temperature of the metallic member in the case of the shrinkage fitting for fitting both the members together and that of both the members in the press fitting are preferably lower than the precipitation hardening temperature of the metallic member and not lower than a temperature at which the joining portion of the metal-ceramic composite article is to be placed in use.

When the metallic member and the ceramic member are fitted together through shrinkage fitting, a deformation proportional to the interference is produced at the metallic member. When the heating temperature of the metallic member is higher than the precipitation hardening temperature thereof, the metallic member is hardened during heating and its ductility is decreased, so that the metallic member is broken during cooling from the temperature at which the shrinkage fitting is performed. Thus, such a heating is unfavorable. Further, when the metallic member and the ceramic member are fitted together by press fitting, if the members are both heated up to a temperature higher than the precipitation hardening temperature, the metallic member is hardened so that the metallic member can not be deformed to cause the metallic member and/or the ceramic member to be broken. Thus, such a heating is also unfavorable.

On the other hand, when the press fitting temperature is lower than the temperature at which the fitting portion of the metal-ceramic composite article is to be placed in use, and the temperature of the fitting portion is increased up to the use temperature, unfavorably, the press fitting portion is loosened to lower the tightness thereof. According to the metal-ceramic composite article of the present invention, the metallic member and the ceramic member are fitted together, and the precipitation hardening treatment is performed while they are heated up to a predetermied temperature to harden the metallic member. Therefore, as the metallic material constituting the metallic member, use may be made of an alloy which can be hardened through precipitation. It is particularly preferable that when the metallic member is constituted by a precipitation hardenable alloy which contracts in volume through the precipitation hardening treatment, the tightness of the fitting portion is increased with the shrinkage of the metallic member in the precipitation hardening treatment so that the tightness between both members are increased. As the precipitation hardenable alloy which is by the precipitation hardening treatment, mention may be made of, for instance, maraging steel, a precipitation-hardenable stainless steel, a precipitation-hardenable super alloy and the like. Thus, use may be selectively made among them to meet an intended use. Other than the above, any alloy may be used so long as it meets the objects of the present invention.

As the ceramic material constituting the metal-ceramics composite article according to the present invention, selection may be made among from silicon silicon nitride, silicon carbide, partially stabilized zirconia, alumina, beryllia, sialon and the like depending upon an intended use of the metal-ceramic composite article according to the present invention. For instance, when a turbocharger rotor is constituted by the metal-ceramics composite article according to the present invention, a turbine wheel which is subjected to a high temperature and a rotation shaft extended thereto are preferably made of silicon nitride having a large strength at a high temperature. On the other hand, when a tappet in which a cam-contacting surface is made of ceramics is formed by the metal-ceramic composite article according to the present invention, the partially stabilized zirconia having a high strength and a high toughness is preferred as the ceramic material. Further, when a heat insulating engine piston in which the piston crown portion is made of ceramics is formed by the metal-ceramics composite article according to the present invention, the partially stabilized zirconia having a coefficient of thermal expansion near that of a cast iron constituting a piston body or silicon nitride having a large thermal shock resistance is desirable as the ceramic material.

In order to improve the wear resistance of the surface of the metallic member of the metal-ceramic composite article according to the present invention, the hardness of the surface of the metallic member may be further increased by a nitriding treatment. The nitriding treatment of the surface of the metallic member of the metal-ceramic composite article according to the present invention may be performed posterior to, simultaneously with, or prior to the precipitation hardening treatment. For instance, in the case that the metallic member is made of an alloy in which the precipitation hardening temperature and the nitriding treatment temperature are equal, it is preferable to simultaneously perform the precipitation hardening treatment and the nitriding treatment. On the other hand, when the metallic member is made of an alloy in which the precipitation hardening temperature is higher than the nitriding treatment temperature, it is preferable to perform the precipitation hardening treatment and the nitriding treatment separately.

The invention will be explained more in detail with reference to the attached drawings.

FIGS. 1-7 illustrate embodiments of the metal-ceramics composite article according to the present invention. FIG. 8 illustrates a testing method for the present invention.

FIG. 1 is a vertically sectional view of a metal-ceramics composite article in which a projection 4 formed at a ceramic member 1 is fitted into a hole 3 formed in the metallic member 2.

FIG. 2 is a structural example of another metal-ceramic composite article in which a projection 4 of a ceramic member 1 is press fitted into a hole 3 of a cylindrical metallic member 2 having at one end of the barrel thereof a flange 6 larger in diameter than the barrel portion. When another metallic member is assembled around the barrel portion of the metallic member of the metal-ceramic composite article according to the present invention, and is secured thereto by means of a threaded portion 5, the flange 6 prevents the metallic member around the barrel portion from being brought into direct contact with the ceramic member and the flange 6 also prevents the stress caused by tightening the threaded portion and the stress due to the difference in the coefficient of thermal expansion between the barrel portion of the metal-ceramic composite article according to the present invention and the metallic member assembled around the barrel portion from being imposed upon the ceramic member.

FIG. 3 is a turbocharger rotor illustrating an embodiment of the metal-ceramic composite article in which a projection 14 formed at the tip end of a rotary shaft 11 which is formed integrally with a turbine wheel 17 made of ceramics is press fitted into a hole 13 formed at the tip end 12 of a rotary shaft made of precipitation hardenable alloy on the side of a compressor wheel. When a bearing incorporated into the shaft on the side of the compressor wheel and the compressor wheel (both being not shown) are secured together by means of a nut, a stepped portion 16 is provided to prevent the axial force acting upon the shaft and the stress due to the difference in the thermal expansion between the aluminum alloy compressor wheel and the precipitation hardening alloy shaft 12 from acting upon the ceramic rotary shaft.

FIGS. 4, 5 and 6 show a heat insulating piston and tappets as application examples for the metal-ceramic composite article of the present invention in which another metallic member is joined to the metallic-ceramic composite article according to the present invention in which a projection 4 formed at a ceramic member and having a larger diameter than that of the through hole 3 formed at the metallic member 2 is fitted into this through hole, by utilizing a threaded portion 2A formed at the outer periphery of the barrel of the metal-ceramic composite article.

FIG. 4 shows a heat insulating engine piston having a piston crown and a piston body made of ceramics and a metal respectively, wherein a hollow space partially including a through hole into which the metal-ceramic composite article according to the present invention is to be inserted is formed at the piston crown portion of a metal piston 19, and the metal-ceramic composite article is inserted into the this hollow space, and they are fixed by means of a threaded portion 19A formed at the through hole and a threaded portion 2A formed in the metal-ceramics composite article.

FIG. 5 is a tappet having a cam-contacting surface 21 made of ceramics, wherein a hollow space into which the metal-ceramic composite article according to the present invention is formed at the cam-contacting surface of a metallic tappet 20, the metal-ceramic composite article according to the present invention is inserted into the hollow space, and they are fixed by means of a threaded portion 20A formed at the hollow space and a threaded portion 2A formed at the metal-ceramics composite article.

FIG. 6 is a tappet having a cam-contacting surface 21 and a push rod-contacting surface 22 made of ceramics, wherein a through hole into which the metal-ceramic composite article according to the present invention is to be inserted is formed at a cam-contacting surface of a metallic tappet 23, the metal-ceramic composite article according to the present invention is inserted into the through hole, and they are fixed by means of a threaded portion 23A formed at the through hole and a threaded portion 2A formed at the outer periphery of the metal-ceramic composite article.

method and at the temperature shown in Table 1 to form a metal-ceramics composite body shown in FIG. 7. The thus obtained metal-ceramic composite body was heated at 500° C. for 3 hours to effect the precipitation hardening treatment, thereby hardening the metallic member of the composite body.

Then, the fitting portion of the composite member was machined to an outer diameter shown in Table 1, and the ceramic member and the metallic member were vertically pulled by using a jig shown in FIG. 8 while being maintained at 350° C. in a heating furnace. The load necessary for disengaging the fitting portion through extraction was measured, and results obtained are shown in Table 1.

TABLE 1(a)

| Sample | No. | Fitting method | Diameter of projection of ceramic member (mm) | Inner diameter of hole of metallic member (mm) | Dimensional difference (%) | Finish outer diameter of fitting portion (mm) | Fitting temperature (°C.) | Time period in precipitation hardening Before fitting | Time period in precipitation hardening After fitting |
|---|---|---|---|---|---|---|---|---|---|
| Present | 1 | shrinkage fitting | 10.0 | 9.97 | 0.30 | 12.0 | 450 | — | o |
| inven- | 2 | press fitting | 8.0 | 7.97 | 0.38 | 10.0 | 350 | — | o |
| tion | 3 | press fitting | 8.0 | 7.90 | 1.25 | 10.0 | 350 | — | o |
|  | 4 | press fitting | 8.0 | 7.80 | 2.50 | 10.0 | 350 | — | o |
|  | 5 | press fitting | 8.0 | 7.50 | 6.25 | 10.0 | 350 | — | o |
|  | 6 | press fitting | 8.0 | 7.30 | 8.75 | 10.0 | 350 | — | o |
| Compar- | 10 | shrinkage fitting | 10.0 | 9.97 | 0.30 | 12.0 | 450 | — | — |
| ative | 11 | shrinkage fitting | 10.0 | 9.97 | 0.30 | 12.0 | 450 | o | — |
| Example | 12 | press fitting | 8.0 | 7.90 | 1.25 | 10.0 | 350 | o | — |
|  | 13 | press fitting | 8.0 | 7.0 | 12.5 | 10.0 | 350 | — | — |
|  | 14 | press fitting | 8.0 | 7.994 | 0.075 | 10.0 | 350 | — | o |
|  | 15 | press fitting | 8.0 | 7.80 | 2.50 | 10.0 | 550 | — | — |
|  | 16 | press fitting | 8.0 | 7.90 | 0.38 | 10.0 | 350 | — | — |

TABLE 1(b)

| Sample | No. | Hardness of metallic memeber (HRC) Before fitting | Hardness of metallic memeber (HRC) After precipitation hardening treatment | Fitting state | Extracting temperature (°C.) | Extracting load (kg) | Extracting result |
|---|---|---|---|---|---|---|---|
| Present | 1 | 32 | 55 | good | 350 | 520 | disengaged at fitting portion |
| inven- | 2 | 32 | 55 | good | 350 | 600 | disengaged at fitting portion |
| tion | 3 | 32 | 55 | good | 350 | 1,300 | disengaged at fitting portion |
|  | 4 | 32 | 55 | good | 350 | not less than 1,500 | broken at ceramic portion |
|  | 5 | 32 | 55 | good | 350 | not less than 1,500 | broken at ceramic portion |
|  | 6 | 32 | 55 | good | 350 | not less than 1,500 | borken at ceramic portion |
| Compar- | 10 | 32 | — | good | 350 | 180 | disengaged at fitting portion |
| ative | 11 | 55 | — | bad | — | — |  |
| Example | 12 | 55 | — | bad | — | — |  |
|  | 13 | 32 | — | bad | — | — |  |
|  | 14 | 32 | 55 | good | 350 | 150 | disengaged at fitting portion |
|  | 15 | 32 | — | bad | — | — |  |
|  | 16 | 32 | — | good | 350 | 200 | disengaged at fitting portion |

The present invention will be explained more in detail by referring to specific examples, which are merely illustrative of the invention and should not be interpreted to limit the scope thereof.

EXAMPLE 1

A ceramic member 1 having a projection 4 of a diameter specified in Table 1 and 25 mm in length was formed from a round bar of silicon nitride produced according to the pressureless sintering method (hereinafter referred to briefly as "silicon nitride"). A metallic member 2 having a barrel diameter shown in Table 1 was formed from a round bar of a solution-treated maraging steel made by Hitachi Kinzoku Company Limited (trade name: YAG-300) in which a hole 3 having an inner diameter shown in Table 1 and a depth of 19 mm was formed at one end of the round bar and a threaded portion was formed at the other end.

The projection of the ceramic member was fitted into the hole of the metallic member according to the In Table 1, Sample Nos. 1-6 give results regarding the metal-ceramic composite articles in which the dimensional difference between the diameter of the projection of the ceramic member and the inner diameter of the hole of the metallic member, the fitting temperature, and the time period at which the metallic member was precipitation hardened fall within the ranges of the present invention. Sample Nos. 10-16 are comparative examples giving results of metal-ceramic composite articles in which the above-recited conditions fall outside of the ranges of the present invention.

As clear from Table 1, the metal-ceramics composite articles according to the present invention exhibit large extracting loads at 350° C. Since the extracting load increases with the decrease in the extracting temperature, the composite article will exhibit an extracting load larger than those shown in Table 1 when the temperature of the fitting portion is at a temperature lower than 350° C. Sample Nos. 4-6 in Table 1 fractured at the ceramic portion during extracting. This means that the extracting load of the fitting portion of the sample Nos. 4-6 is higher than the tensile fracture load of the ceramic portion.

On the other hand, as clear from Sample Nos. 10 and 16 in Table 1, the extracting load of the metal-ceramic composite articles which were subjected to the extraction test without being precipitation-hardened after the metallic member and the ceramic member were fitted together are smaller than those of the metal-ceramic composite article according to the present invention. Similarly, in the case where the precipitation hardened metallic member and the ceramic member are fitted together, as shown in Sample Nos. 11-12 of Table 1, the metallic member was broken during cooling from the fitting temperature due to the insufficient deformation of the metallic member. Further, in the case of the metal-ceramic composite article in which the dimensional difference between the projection of the ceramic member and the hole of the metallic member at the fitting portion is outside of the range of the present invention, the extracting load at 350° C. is too small (Table 1, Sample No. 14), or the load required for the press fitting is so large as to break the ceramic member (Table 1, Sample No. 12).

When the fitting temperature is over the range of the present invention, the precipitation hardening takes place due to the heating up to the fitting temperature, so that the metallic member is hardened to increase the load required for the press fitting and the ceramic member is broken (Table 1, Sample No. 15).

EXAMPLE 2

A turbine wheel of 60 mm in diameter and a turbine shaft of 9 mm in diameter were integrally formed from silicon nitride obtained according to the pressureless sintering method to produce a ceramic member of 72 mm in total length. A projection of 6.0 mm in diameter and 19 mm in length was formed at the tip end of the turbine shaft of the ceramic member. A hole of 5.8 mm in inner diameter and 17 mm in depth was formed at one end of a solution-treated maraging steel (Hitachi Kinzoku Company Limited, YAG-300) of 70 mm in total length and 9 mm in diameter. The projection of the tip end of the turbine shaft was press fitted into the hole at 350° C. to produce a turbocharger rotor in which the turbine wheel and a part of the turbine shaft were made of silicon nitride. The thus obtained turbocharger rotor was heated at 550° C. for 3 hours to effect the precipitation hardening, thereby hardening the metallic member, and was then finish machined to a predetermined dimension. This turbocharger rotor was assembled into a high temperature rotation tester, and a rotation test was carried out at 150,000 rpm for 100 hours using a combustion gas. No abnormality was observed.

EXAMPLE 3

A round plate of 69 mm in diameter and 3 mm in thickness having a projection of 15 mm in diameter and 15 mm in length at the center thereof was formed from a partially stabilized zirconia containing 5.2% of $Y_2O_3$. Additionally, a metallic member having an outer diameter of 35 mm at a flange portion, a 25 mm outer diameter at the barrel portion, a 14.7 mm inner diameter at a hole, and 15 mm in total length was formed from the maraging steel. The projection of the zirconia ceramic was press fitted into the hole of the metallic member at 350° C. to produce a metal-ceramic composite body. After a threaded portion was formed at the barrel portion of the metallic member of the metal-ceramic composite body, the precipitation hardening treatment was performed at 550° C. for 3 hours, thereby hardening the metal member.

On the other hand, a hollow space partially comprising a through hole into which the thus obtained metal-ceramic composite article was to be fitted was formed at a part of a piston crown portion of a piston made of nodular graphite cast iron having a diameter of 70 mm. Then, a threaded portion formed at the through hole and the threaded portion formed at the barrel of the metallic member of the metal-ceramic composite article were fixed together to produce a heat insulating engine piston having a profile shown in FIG. 4 in which a part of the piston crown was made of the partially stabilized zirconia, while the piston body was made of the nodular graphite cast iron. When the piston was operated in a diesel engine having a diameter of 70 mm at a stroke of 75 mm and 2,200 rpm for 1 hour, no abnormality was observed.

As clear from the foregoing, according to the metal-ceramic composite article of the present invention, the metallic member is made of the precipitation hardenable alloy, and the projection formed at the ceramic member is fitted into the hole formed in the metallic member in the state in which precipitation-hardening is not carried out so as to carry out the integral joining, and the thus joined composite body is subjected to the precipitation hardening treatmen to cause the hardening and the contraction in volume of the metallic member, so that the joining strength is large and the wear resistance of the metallic member is excellent. Therefore, when the turbocharger rotor is constituted by a metal-ceramic composite article according to the present invention while the turbine wheel and a part of the turbine shaft being made of silicon nitride and a part or all of the other being made of the precipitation hardenable alloy, the high efficiency turbocharger with excellent response and durability can be obtained.

Further, in the heat insulating engine piston having a part of the piston crown made of a ceramic and the piston body made of a metal wherein a hollow space into which the metal-ceramic composite article according to the present invention is to be inserted is formed in the piston crown of the metal piston, and the threaded portion formed in this hollow space and the threaded portion formed at the barrel portion of the metallic member of the metal-ceramics composite article according to the present invention are fixed together, since the piston crown which is exposed to a high temperature combustion gas can be made of ceramic with a high heat insulating property, so that the piston with a high heat insulating property can be obtained.

Since the cam-contacting surface of the tappet can be made of ceramic by inserting the metal-ceramics composite article according to the present invention, the tappet with an excellent wear resistance can be obtained.

As has been described, the metal-ceramic composite article according to the present invention can be used as engine parts such as turbocharger, piston, tappet, suction valve, exhaust valve, rocker arm, and cam, a structural parts which are subjected to a high temperature and repeated load, such as refractory fixing bolt in a heating furnace, and parts for a heat treating furnace.

What is claimed is:

1. A metal-ceramic composite article comprising a metallic member made of a precipitation hardenable alloy and a ceramic member, wherein a projection of the ceramic member is fitted into a hole or a through hole formed in the metallic member, and after said fitting is effected, the metallic member of the composite article is hardened by precipitation hardening.

2. A metal-ceramic composite article according to claim 1, wherein the metallic member of the metal-ceramic composite article is hardened by precipitation hardening and by a nitriding treatment, and at least a portion of the surface layer of the metallic member has a hardness which is greater than a hardness of the central portion thereof.

3. A metal-ceramic composie article according to claim 1, wherein the precipitation hardenable alloy contracts in volume during precipitation hardening.

4. A metal-ceramic composite article according to claim 2, wherein a surface of the precipitation hardenable alloy is capable of being hardened by the nitriding treatment.

5. A metal-ceramic composite article according to claim 1, wherein the precipitation hardenable alloy comprises a metal selected from the group consisting of maraging steel, precipitation-hardenable stainless steel, and precipitation-hardenable super alloys.

6. A metal-ceramic composite article according to claim 1, wherein the ceramic member comprises at least one ceramic material selected from the group consisting of silicon nitride, silicon carbide, sialon, alumina and partially stabilized zirconia.

7. A metal-ceramic composite article according to claim 1, wherein the ceramic member comprises a turbine wheel and a rotary shaft on a turbine wheel side of a turbocharger rotor, and the metallic member comprises a rotary shaft on a compressor wheel side of the turbocharger rotor.

8. A metal-ceramic composite article according to claim 1, wherein the ceramic member comprises a piston crown and the metallic member comprises a portion of a piston body.

9. A metal-ceramic composite article according to claim 1, wherein the ceramic member comprises a cam-contacting surface of a tappet and the metallic member comprises a portion of a tappet body.

10. A process for manufacturing a metal-ceramic composite article, which comprises the steps of: fitting a projection of a ceramic member into a hole formed in a metallic member to form a metal-ceramic composite body, said metallic member comprising a precipitation hardenable alloy, wherein precipitation-hardening has not occurred, and subjecting the thus formed metal-ceramic composite body to a precipitation hardening treatment to harden the metallic member.

11. A process for manufacturing the metal-ceramic composite article according to claim 10, wherein the projection of the ceramic member and the hole in the metallic member are fitted together by press fitting.

12. A process for manufacturing the metal-ceramic composite article according to claim 11, wherein an outer diameter of the ceramic member is 0.1-10% greater than an inner diameter of the hole in the metallic member, prior to press fitting.

13. A process for manufacturing the metal-ceramic composite article according to claim 10, which further comprises a step of subjecting the metal-ceramic composite article to a nitriding treatment to further harden at least a portion of a surface of the metallic member after the metal-ceramic composite body has been subjected to the precipitation hardening treatment.

14. A process for manufacturing the metal-ceramic composite article according to claim 10, wherein the metal-ceramic composite body is heated up to a precipitation hardening temperature in a heating furnace in which the furnace atmosphere is a nitriding atmosphere and the metallic member is simultaneously hardened by precipitation hardening.

15. A process for manufacturing the metal-ceramic composite article according to claim 10, wherein a nitriding treatment is performed before the precipitation hardening.

16. A process for manufacturing the metal-ceramic composite article according to claim 10, wherein the fitting of the projection of the ceramic member into the hole of the metallic member comprises press fitting at a temperature lower than the precipitation hardening temperature of the metallic member.

17. A process for manufacturing the metal-ceramic composite article according to claim 10, wherein the fitting of the projection of the ceramic member into the hole of the metallic member comprises a fitting selected from the group consisting of fitting and expansion fitting.

18. A process for manufacturing the metal-ceramic composite article according to claim 10, wherein the precipitation hardenable alloy contracts in volume during precipitation hardening.

19. A process for manufacturing the metal-ceramic composite article according to claim 10, wherein the precipitation hardenable alloy comprises a surface which is capable of being hardened by a nitriding treatment.

20. A process for manufacturing the metal-ceramic composite article according to claim 10, wherein the precipitation hardenable alloy is selected from the group consisting of maraging steel, precipitation-hardenable stainless steel, and precipitation-hardenable super alloys.

21. A process for manufacturing the metal-ceramic composite article according to claim 10, wherein the metallic member comprises at least one ceramic material selected from the group consisting of silicon nitride, silicon carbide, sialon, alumina and partially stabilized zirconia.

* * * * *